(12) United States Patent
Crowe et al.

(10) Patent No.: US 9,871,925 B2
(45) Date of Patent: Jan. 16, 2018

(54) MANAGING A MULTI-USER COMMUNICATION BASED ON THE TOPICAL EXPERTISE OF ONE OR MORE USERS

(71) Applicant: Lenovo Enterprise Solutions (Singapore) Pte. Ltd., Singapore (SG)

(72) Inventors: John S. Crowe, Durham, NC (US); Gary D. Cudak, Wake Forest, NC (US); Jennifer J. Lee-Baron, Morrisville, NC (US); Nathan J. Peterson, Durham, NC (US); Amy L. Rose, Chapel Hill, NC (US); Bryan L. Young, Tualatin, OR (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 105 days.

(21) Appl. No.: 14/875,295

(22) Filed: Oct. 5, 2015

(65) Prior Publication Data
US 2017/0099390 A1  Apr. 6, 2017

(51) Int. Cl.
*H04M 3/523* (2006.01)
*H04M 3/56* (2006.01)
*H04M 3/51* (2006.01)

(52) U.S. Cl.
CPC ....... *H04M 3/5233* (2013.01); *H04M 3/5175* (2013.01); *H04M 3/5191* (2013.01); *H04M 3/563* (2013.01); *H04M 3/566* (2013.01)

(58) Field of Classification Search
None
See application file for complete search history.

(56) References Cited

U.S. PATENT DOCUMENTS

| | | | |
|---|---|---|---|
| 9,317,574 B1 * | 4/2016 | Brisebois | G06F 17/30864 |
| 2009/0292722 A1 * | 11/2009 | Ayloo | G06Q 10/10 |
| 2011/0270609 A1 * | 11/2011 | Jones | H04M 3/56 704/235 |
| 2017/0097979 A1 * | 4/2017 | Crowe | G06F 17/30598 |

* cited by examiner

Primary Examiner — Harry S Hong
(74) Attorney, Agent, or Firm — Jeffrey L. Streets (57) ABSTRACT

A method and a computer program product for causing a processor to perform the method, where the method includes identifying a plurality of users participating in a multi-user communication, determining a topic of the multi-user communication, obtaining a topical expertise level relative to the topic for each of the identified users, ranking each user participating in the multi-user communication according to the topical expertise level for each user, and modifying, for one or more of the users, at least one parameter of participation in the multi-user communication according to the topical expertise rank of the one or more users.

17 Claims, 8 Drawing Sheets

User A
Media Access History

| Instance | Topic | Duration | Quality (1-3) | Score |
|---|---|---|---|---|
| 1 | Servers | 20 | 3 | 60 |
| 2 | Networks | 15 | 2 | 30 |
| 3 | Football | 5 | 1 | 5 |
| 4 | Restaurants | 8 | 1 | 8 |
| 5 | Servers | 10 | 2 | 20 |
| 6 | Servers | 15 | 3 | 45 |
| 7 | Networks | 15 | 2 | 30 |
| 8 | Servers | 30 | 1 | 30 |

FIG. 5A

User A
Topical Expertise

| Topic | Topical Expertise Score |
|---|---|
| Servers | 9 |
| Networks | 4 |

FIG. 5B

User A
Topical Expertise

| Topic | Topical Expertise Score |
|---|---|
| Servers | 155 |
| Networks | 60 |

FIG. 5C

Keyword/Topic Associations

| Topic | Keywords |
|---|---|
| Servers | Blades, x86, chassis, motherboard, cluster, virtualization, workload, BMC, IPMI, I2C, |
| Networks | LAN, bandwidth, topology, switch, ports, latency, Ethernet, packets, |
| Patents | invention, obviousness, infringement, claims, assignment, disclosure, USPTO, examiner |

FIG. 6A

Sources/Topic Associations

| Topic | Sources |
|---|---|
| Servers | www.lenovo.com/business-servers<br>www.ieee.org/2015-server-update.pdf |
| Networks | standards.ieee.org/about/802.3<br>www.lenovo.com/flex-system-interconnect-fabric |
| Patents | www.uspto.gov/patent<br>www.epo.org/searching/free/espacenet.html |

Topical Expertise Ranking
(Topic: Servers)

| Individual Person/User | Topical Expertise Score | Topical Expertise Rank |
|---|---|---|
| John White | 150 | 4 |
| Bob Smith | 260 | 2 |
| Ann Wells | 195 | 3 |
| Kendall Brown | 285 | 1 |

FIG. 8A

Topical Expertise Ranking
(Topic A: Servers, Topic B: Networks)

| Individual Person/User | Topical Expertise Score (Topic A) | Topical Expertise Score (Topic B) | Cummulative Score | Rank |
|---|---|---|---|---|
| John White | 150 | 270 | 420 | 4 |
| Bob Smith | 260 | 300 | 560 | 1 |
| Ann Wells | 195 | 290 | 485 | 3 |
| Kendall Brown | 285 | 260 | 545 | 2 |

FIG. 8B

Topical Expertise Ranking
(Topic A: Servers (75%), Topic B: Networks(25%))

| Individual Person/User | Topical Expertise Score (Topic A) | Topical Expertise Score (Topic B) | Cummulative Score | Rank |
|---|---|---|---|---|
| John White | 150 | 270 | 180 | 4 |
| Bob Smith | 260 | 300 | 270 | 2 |
| Ann Wells | 195 | 290 | 219 | 3 |
| Kendall Brown | 285 | 260 | 279 | 1 |

FIG. 8C

MANAGING A MULTI-USER COMMUNICATION BASED ON THE TOPICAL EXPERTISE OF ONE OR MORE USERS

BACKGROUND

Field of the Invention

The present invention relates to a multi-user communication, such a conference call or message board.

Background of the Related Art

Multi-user communications and media are becoming increasingly important in the way many businesses are run. For instance, some businesses hold user forums to assist in solving customer problems or hold conference calls among employees to address internal processes. These forms of multi-user communications are critical to running an effective business and they are becoming increasingly impromptu rather than scheduled.

One potential problem with such multi-user communications is that participants with the most experience and knowledge may be overshadowed or prevented from making a significant contribution by participants that are less experienced. For various participants, there can be significant time and difficulty involved in determining which contributions have a higher probability of success. While assigning a moderator to control individual contributions can be helpful, the moderator may not know which participant has the most experience or knowledge on a particular topic.

BRIEF SUMMARY

One embodiment of the present invention provides a method, comprising identifying a plurality of users participating in a multi-user communication, determining a topic of the multi-user communication, obtaining a topical expertise level relative to the topic for each of the identified users, ranking each user participating in the multi-user communication according to the topical expertise level for each user, and modifying, for one or more of the users, at least one parameter of participation in the multi-user communication according to the topical expertise rank of the one or more users.

Another embodiment of the present invention provides a computer program product comprising a non-transitory computer readable storage medium having program instructions embodied therewith, wherein the program instructions are executable by a processor to cause the processor to perform a method. The method comprises identifying a plurality of users participating in a multi-user communication, determining a topic of the multi-user communication, obtaining a topical expertise level relative to the topic for each of the identified users, ranking each user participating in the multi-user communication according to the topical expertise level for each user, and modifying, for one or more of the users, at least one parameter of participation in the multi-user communication according to the topical expertise rank of the one or more users.

DETAILED DESCRIPTION

One embodiment of the present invention provides a method, comprising monitoring media access using a computer, wherein the media access includes a plurality of instances of media access attributable to an individual person. The method further comprises identifying a topic for each instance of the media access, and identifying a media quality level for each instance of the media access. The method still further comprises determining a topical expertise score for the individual person on one or more of the identified topics as a function of the identified quality level of each instance of the media access.

A computer may access media using various interfaces, such as a web browser, email application, video player, document viewer, download manager, and voice over Internet Protocol (VOIP) software. Furthermore, a web browser may allow access to media types such as web pages, documents, message boards, help desk systems, and blogs. Other types of media access may also be monitored and used in accordance with the present invention.

An "instance" of media access is a particular occurrence that may be characterized by a particular media source and duration of access. When the media or media address changes, then another instance of media access may begin. In a preferred implementation, an instance of media access may be attributable to a particular individual person in response to determining that the media was accessed using a personal login or account. The personal login or account may be entered into an operating system, such that all media access between login and logoff are attributable to the individual person. Alternatively, a personal login or account may be used to gain access to a particular web service, such as a digital library, such that all files accessed between login and logoff are attributable to the individual person. It should be recognized that a second individual person might use the same computer or wireless communication device to access the same media, yet the media access should be attributable to that second individual person due the use of their own unique login or account.

In one embodiment of the method, a topic may be identified for each instance of the media access by identifying keywords in each instance of the media access or metadata regarding the media access, and identifying a topic that has a predetermined association with the identified keywords. For example, a list, table or database of topics and associated keywords may be stored and available for reference in identifying a topic based on identified keywords. In an alternative embodiment, a topic may be identified for each instance of the media access by identifying a source of each instance of the media access, and identifying a topic that has a predetermined association with the source. For example, a list, table or database of topics and associated sources may be stored and available for reference in identifying a topic based on an identified source of the media.

In another embodiment of the method, a media quality level for each instance of the media access may be identified according to individual reviewer rankings of the media, organizational reviewer rankings of the media, the citation of references within the media, the use of complex terminology or graphics, or whether more recent media is available on the topic of the media accessed. Optionally, media quality may be identified for an entire source or publication, such as a peer-reviewed journal, such that all media accessed from that source or publication would be identified as having the stated media quality.

In a further embodiment, the method may include determining a topical expertise score for the individual person on one or more of the identified topics by determining a score for each instance of the media access on an identified topic. Then, the topical expertise score may be the cumulative total of all scores for the individual person on the identified topic during a period of time. In one option, the determination of a topical expertise score may further include adding points to the topical expertise score for the individual person on an identified topic in response to determining that the individual person has a college degree associated with the identified topic, experience with the identified topic, or endorsements associated with the identified topic. Data regarding an individual's education, experience and endorsements may be obtained by interfacing with a web resource, such as a social media website for professionals.

The method may further increase the topical expertise score for the individual person relative to one or more of the identified topics in response to identifying media in which the individual person contributed, such as being named as an author or co-author. Such media may be identified by searching public or private sources regardless of whether the individual person accesses the media. In one example, the media in which the individual person contributed may be selected from published articles and recorded conference presentations. In one option, the topical expertise score for the individual person relative to one or more of the identified topics may be further increased in response to identifying media that cites to media in which the individual person contributed. For example, the topical expertise score may be increased if the individual authored a published article that was recognized by citation in another published article.

In yet another embodiment, the method may further comprise determining an amount of time spent on each instance of the media access. Accordingly, the topical expertise score for the individual person on one or more of the identified topics may be determined as a function of the determined amount of time and the identified quality level of each instance of the media access. Optionally, the topical expertise score may be determined by a sum of each instance score, wherein an instance score is the mathematical product of the determined amount of time and the identified quality level for a particular instance of media access.

Optionally, the amount of time spent on each instance of the media access may be determined as an amount of time spent actively interacting with each instance of the media access. Merely having a browser window open to display a web document does not accurately indicate that an individual is actually present and focused on the web document. In one option, an amount of time spent actively interacting with each instance of the media access includes time accessing the media at a scrolling rate in a predetermine range consistent with reading, time accessing the media with detection of eye focus on a screen displaying the media, or a combination thereof. Other measures of active interaction may also be used to indicate that the individual user is actually spending time focused on the media accessed.

The topical expertise score may be utilized for a variety of purposes and in a variety of applications. In fact, the topical expertise score may be used in multiple applications. For example, a topical expertise score may be used in a multi-user communication to determine which user has the most expertise in the topic of the communication. In another example, a topical expertise score may be used by a human resource management application that monitors the expertise of employees for use when making management decisions.

In a specific implementation of the method, the method may further comprise identifying each of the users participating in a multi-user communication, determining a current topic of the multi-user communication, obtaining a topical expertise score relative to the current topic for each of the users participating in the multi-user communication, ranking each user participating in the multi-user communication according to the topical expertise score for each user, and modifying, for one or more of the users, at least one parameter of participation in the multi-user communication according to the topical expertise rank of the user. For example, modifying, for one or more of the users, at least one parameter of participation in the multi-user communication according to the topical expertise rank of the user, includes assigning the user with the highest topical expertise rank as the moderator with the ability to mute input from other users or delete posts from other users.

Another embodiment of the present invention provides a computer program product comprising a non-transitory computer readable storage medium having program instructions embodied therewith, the program instructions executable by a processor to cause the processor to perform a method. The method comprises monitoring media access using a computer, wherein the media access includes a plurality of instances of media access attributable to an individual person. The method further comprises identifying a topic for each instance of the media access, and identifying a media quality level for each instance of the media access. The method still further comprises determining a topical expertise score for the individual person on one or more of the identified topics as a function of the identified quality level of each instance of the media access.

The foregoing computer program products may further include computer readable program code for implementing or initiating any one or more aspects of the methods described herein. Accordingly, a separate description of the methods will not be duplicated in the context of a computer program product.

APPLICATIONS USING TOPICAL EXPERTISE

One embodiment of the present invention provides a method, comprising identifying a plurality of users participating in a multi-user communication, determining a topic of the multi-user communication, obtaining a topical expertise level relative to the topic for each of the identified users, ranking each user participating in the multi-user communication according to the topical expertise level for each user, and modifying, for one or more of the users, at least one parameter of participation in the multi-user communication according to the topical expertise rank of the one or more users. Optionally, the topic may be determined periodically during a duration of the multi-user communication.

The multi-user communication may be any type or form of communication presently known or developed in the future that involved multiple users or participants. For example, the multi-user communication may be a conference call, video conference, message board, blog, or online chat.

In one embodiment of the method, a topic of a multi-user communication may be determined by identifying the use of keywords within the multi-user communication and determining a topic most closely associated with those keywords. For example, a list, table or database of topics and associated keywords may be stored and available for reference in determining a topic based on identified keywords. Optionally, the method may repeat the step of ranking the topical expertise level of each user participating in the multi-user communication in response to determining that the topic has changed.

In another embodiment of the method, the step of determining a topic of a multi-user communication includes determining multiple topics of the multi-user communication, and the step of obtaining a topical expertise level relative to the topic for each of the users participating in the multi-user communication includes obtaining a topical expertise level relative to at least one of the topics for each of the users participating in the multi-user communication.

When multiple topics are being discussed, expertise levels for each topic may be considered. In one option, the method may further comprise determining a weighting factor for each of the multiple topics. Accordingly, the step of ranking each user participating in the multi-user communication according to the topical expertise level for each user, may include ranking each user participating in the multi-user communication according to a composite or cumulative topical expertise level. The composite or cumulative topical expertise level for each user may be the sum of weighted topical expertise levels for the topics, wherein the weighted topical expertise level for a topic is the product of the topical expertise level of the user for the topic and the weighting factor for the topic. A further option provides the method with a specific manner of determining a weighting factor for each of the multiple topics. Accordingly, steps for determining a weighting factor for each of the multiple topics may include identifying each occurrence of keywords used in the multi-user communication, associating each of the identified keywords with one of the topics, and determining the weighting factor for each topic as the percentage of occurrences of the identified keywords associated with that topic.

A topical expertise level relative to the topic for each of the users participating in the multi-user communication may be determined in various manners, including manually entering a topical expertise level, obtaining endorsements from others regarding a topical expertise level of each user relative to the topic, or automatically determining a topical expertise level. Methods of automatically determining a topical expertise level are disclosed above. Preferably, if the topic is determined to change during a multi-user communication, then each user's topical expertise level for the new topic is obtained, the method updates the ranking of the topical expertise level of each user during the communication.

A parameter of participation in the multi-user communication may be modified in any manner according to the topical expertise rank of the one or more users. In one non-limiting example, a parameter of participation is modified by assigning the user with the highest topical expertise rank as the moderator with the ability to mute input from other users or delete posts from other users. In other examples, a parameter of participation may be modified by adjusting transmission priority or volume as a function of a user's topical expertise rank or by displaying a graphical user interface that visually differentiates the topical expertise rank of the one or more users. In one specific embodiment, the multi-user communication is a message board, wherein modifying, for one or more of the users, at least one parameter of participation in the multi-user communication according to the topical expertise rank of the one or more users, includes tagging a comment with a response value based on the topical expertise level of a user making the comment.

An additional embodiment of the method may further comprise maintaining a listing of topical experts and a topical expertise level on various topics for each topical expert, identifying one of the topical experts that has a topical expertise level on the topic that is greater than a predetermined topical expertise level, and automatically inviting the identified topical expert to join the communication in response to determining that none of the users participating in the multi-user communication has a topical expertise level greater than the predetermined topical expertise level. For example, inviting the identified topical expert may include automatically sending a message or initiating a telephone call to the identified topical expert. In a similar embodiment, the method further comprises maintaining a listing of topical experts and a topical expertise level on various topics for each topical expert, identifying one of the topical experts that has a topical expertise level on the topic that is greater than the topical expertise levels of the users participating in the multi-user communication, and automatically inviting the identified topical expert to join the communication in response to determining that the topic of the multi-user communication has not changed for a period of time exceeding a predetermined duration. Alternatively, the method may invite multiple experts or members of a team that focus on the topic.

Another embodiment of the present invention provides a computer program product comprising a non-transitory computer readable storage medium having program instructions embodied therewith, wherein the program instructions are executable by a processor to cause the processor to perform a method. The method comprises identifying a plurality of users participating in a multi-user communication, determining a topic of the multi-user communication, obtaining a topical expertise level relative to the topic for each of the identified users, ranking each user participating in the multi-user communication according to the topical expertise level for each user, and modifying, for one or more of the users, at least one parameter of participation in the multi-user communication according to the topical expertise rank of the one or more users.

The foregoing computer program products may further include computer readable program code for implementing or initiating any one or more aspects of the methods described herein. Accordingly, a separate description of the methods will not be duplicated in the context of a computer program product.

Figure 1:
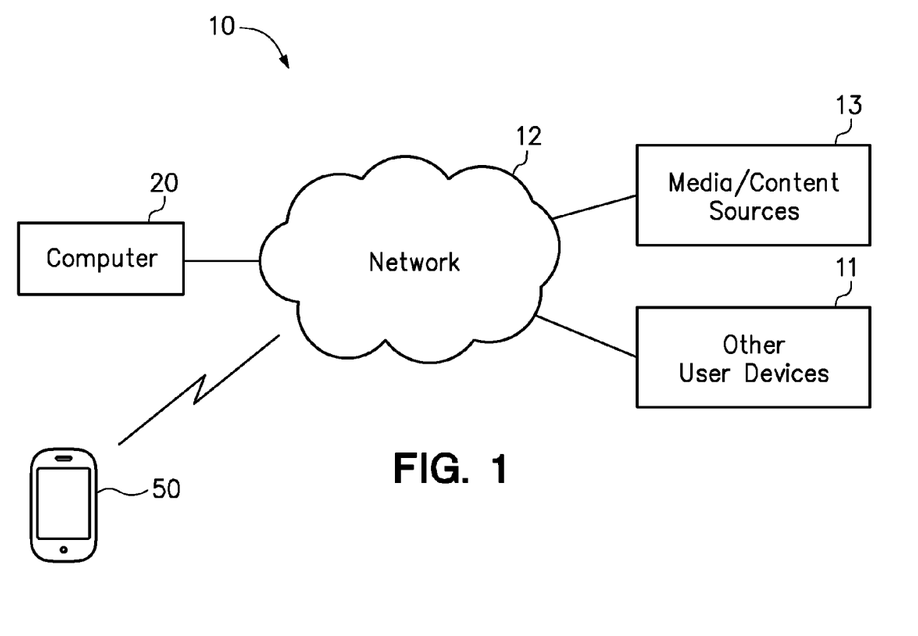
FIG. 1 is a diagram of a system including a computer, wireless mobile communication device or other user devices that can access media.

FIG. 1 is a diagram of a system 10 including a computer 20, a wireless mobile communication device 70 and other user devices 11 connected to a network 12 and able to access media on various media/content sources 13. The network 12 may include a wired or wireless communication system and may include the Internet. It should be recognized that the media/content sources 13 may include any number and type of sources, such as web servers and storage area networks. In accordance with certain embodiments of the present invention, an individual person may use the computer 20, the wireless mobile communication device 70 and/or other user devices 11 to access media such that a topical expertise level, score or rank may be determined for the individual relative to one or more topic. In accordance with other embodiments of the present invention, the devices 10, 70, 11 may be allow multiple users to engage in a multi-user communication over the network.

Figure 2:
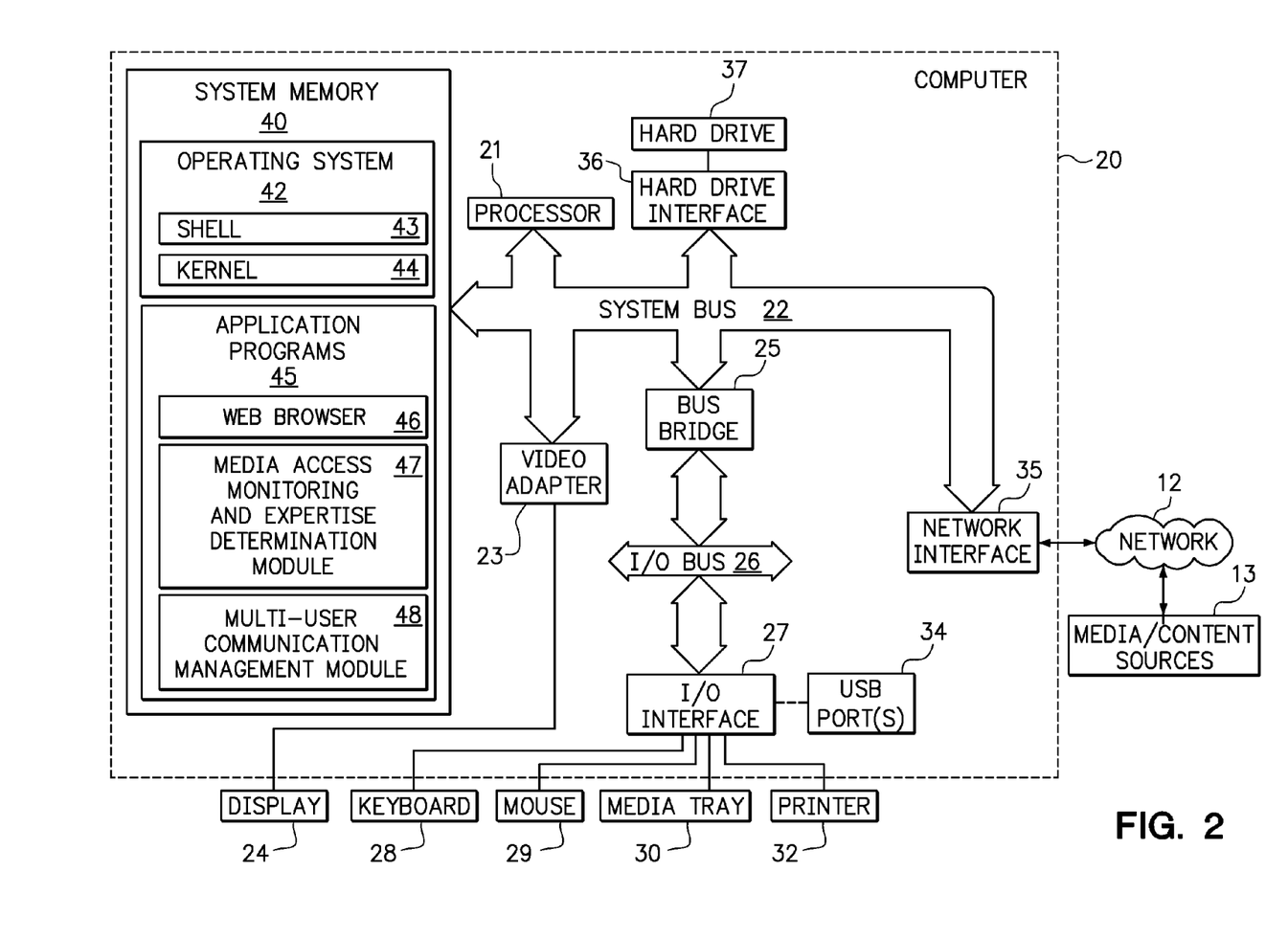
FIG. 2 is a diagram of a computer according to one embodiment of the present invention.

FIG. 2 is a diagram of a computer or server 20 that is capable of implementing the methods of the present invention. The computer 20 includes a processor unit 21 that is coupled to a system bus 22. The processor unit 21 may utilize one or more processors, each of which has one or more processor cores. A video adapter 23, which drives/supports a display 24, is also coupled to the system bus 22. The system bus 22 is coupled via a bus bridge 25 to an input/output (I/O) bus 26. An I/O interface 27 is coupled to the I/O bus 26 and provides communication with various I/O devices, including a keyboard 28, a mouse 29, a media tray 30 (which may include storage devices such as CD-ROM drives, multi-media interfaces, etc.), a printer 32, and USB port(s) 34. As shown, the computer 20 is able to communicate with other network devices, such as the media/content sources 13, via the network 12 using a network adapter or network interface controller 35.

A hard drive interface 36 is also coupled to the system bus 22. The hard drive interface 36 interfaces with a hard drive 37. In a preferred embodiment, the hard drive 37 communicates with system memory 40, which is also coupled to the system bus 22. System memory includes the lowest level of volatile memory in the computer 20. This volatile memory may include additional higher levels of volatile memory (not shown), including, but not limited to, cache memory, registers and buffers. Data that populates the system memory 40 includes the operating system (OS) 42 and application programs 45.

The operating system 42 includes a shell 43 for providing transparent user access to resources such as application programs 45. Generally, the shell 43 is a program that provides an interpreter and an interface between the user and the operating system. More specifically, the shell 43 executes commands that are entered into a command line user interface or from a file. Thus, the shell 43, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 44) for processing. Note that while the shell 43 is a text-based, line-oriented user interface, the present invention will equally well support other user interface modes, such as graphical, voice, gestural, etc.

As depicted, the operating system 42 also includes the kernel 44, which includes lower levels of functionality for the operating system 42, including providing essential services required by other parts of the operating system 42 and application programs 45, including memory management, process and task management, disk management, and mouse and keyboard management. The application programs 45 in the system memory of the computer 20 may include, without limitation, a web browser 46, a media access monitoring and expertise determination module 47, and a multi-user communication management module 48.

Embodiments of the present invention may include both modules 47, 48, but may also include only one of the modules 47, 48. If a computer is being used only for the purpose of purpose of making topical expertise determinations, then only the expertise determination module 47 is needed. Conversely, if a computer has access to topical expertise score, and therefore does not need to make such determinations, then only the multi-user communication management module 48 is needed. These considerations are equally applicable to the wireless mobile communication device 50 in FIG. 3.

The hardware elements depicted in the computer 10 are not intended to be exhaustive, but rather are representative. For instance, the computer 10 may include alternate memory storage devices such as magnetic cassettes, digital versatile disks (DVDs), Bernoulli cartridges, and the like. These and other variations are intended to be within the scope of the present invention.

Figure 3:
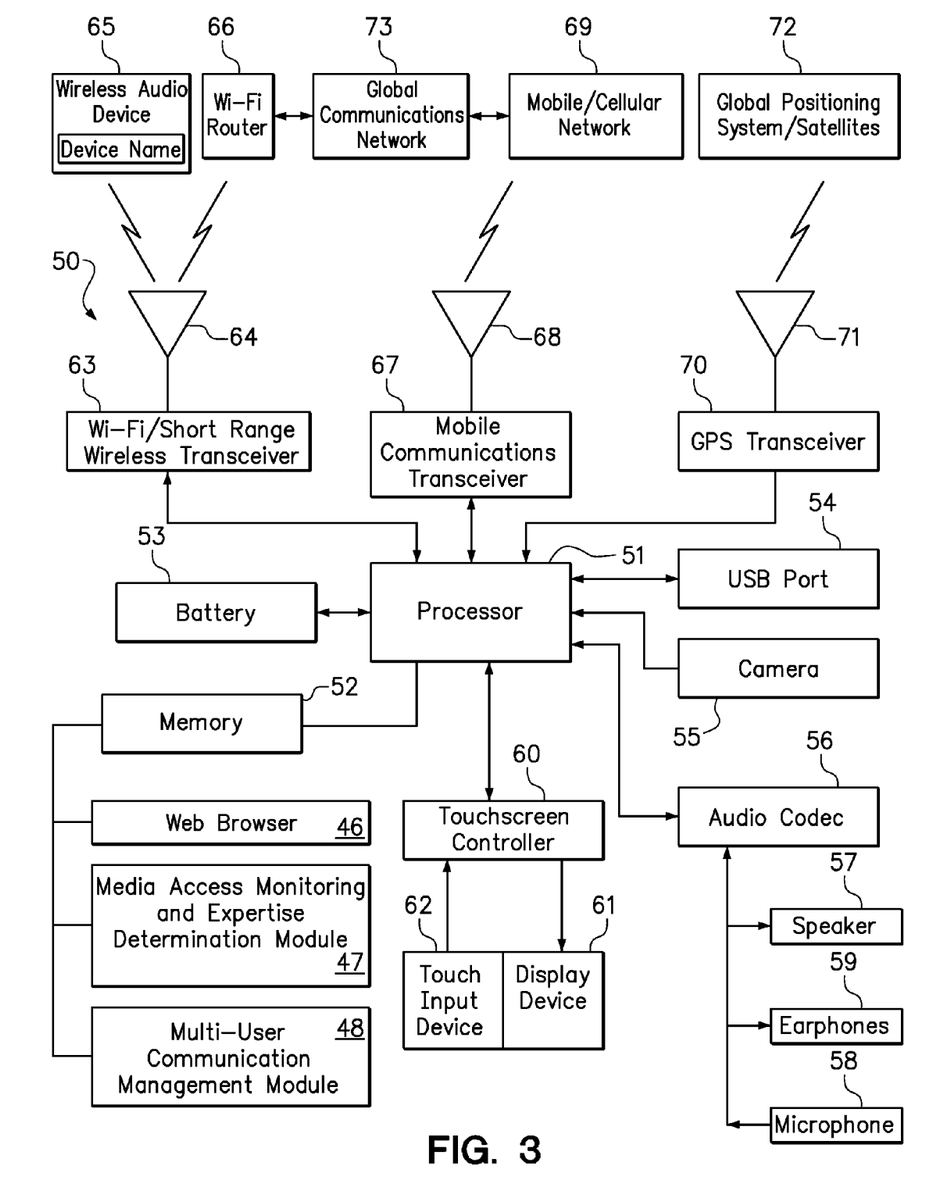
FIG. 3 is a diagram of a wireless mobile communication device.

FIG. 3 is a diagram of the wireless mobile communication device 50, such as a smart phone, capable of participating in, or implementing, embodiments of the present invention. The communication device 50 may include a processor 51, memory 52, a battery 53, a universal serial bus (USB) port 54, a camera 55, and an audio codec 56 coupled to a speaker 57, a microphone 58, and an earphone jack 59. The communication device 50 may further include a touchscreen controller 60 which provides a graphical output to the display device 61 and an input from a touch input device 62. Collectively, the display device 61 and touch input device 62 may be referred to as a touchscreen.

The communication device 50 may also include a Wi-Fi and/or Bluetooth transceiver 63 and corresponding antenna 64 allowing the device to communicate with a wireless (Bluetooth) audio device 65 or a Wi-Fi router 66, a mobile communication transceiver 67 and corresponding antenna 68 allowing the device to communicate over a mobile/cellular network 69, and a global positioning system (GPS) transceiver 70 and corresponding antenna 71 allowing the device to obtain signals from a global positioning system or satellites 72. In a non-limiting example, the Wi-Fi router 66 and the mobile/cellular network 69 may be connected to a global communications network 73, such as the Internet. It should be recognized that the Wi-Fi router 66, mobile/cellular network 69, and global communications network 73, may all be part of the network 12 of FIG. 1. As shown, the memory 52 stores a web browser 46, a media access monitoring and expertise determination module 47, and a multi-user communication management module 48.

Figure 4:
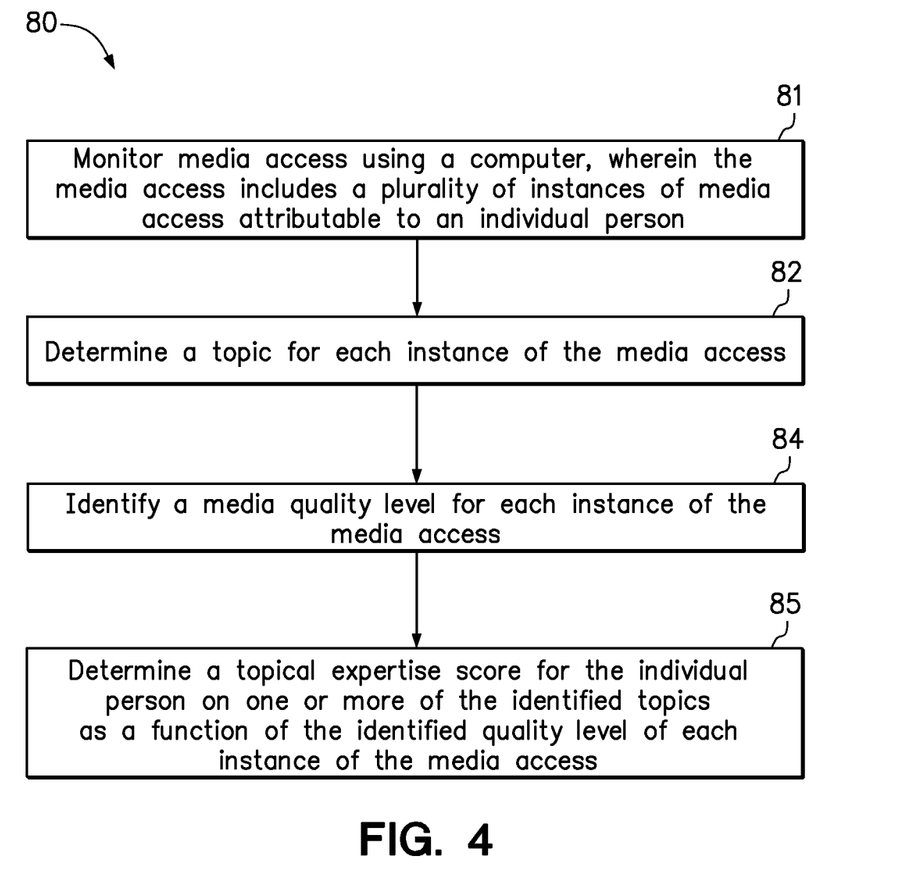
FIG. 4 is a flowchart of a method of determining topical expertise.

FIG. 4 is a flowchart of a method 80 of determining topical expertise. In step 81, the method include monitoring media access using a computer, wherein the media access includes a plurality of instances of media access attributable to an individual person. Step 82 determines a topic for each instance of the media access, and step 84 identifies a media quality level for each instance of the media access. In step 85, the method determines a topical expertise score for the individual person on one or more of the identified topics as a function of the identified quality level of each instance of the media access.

Figures 5A, 5B:
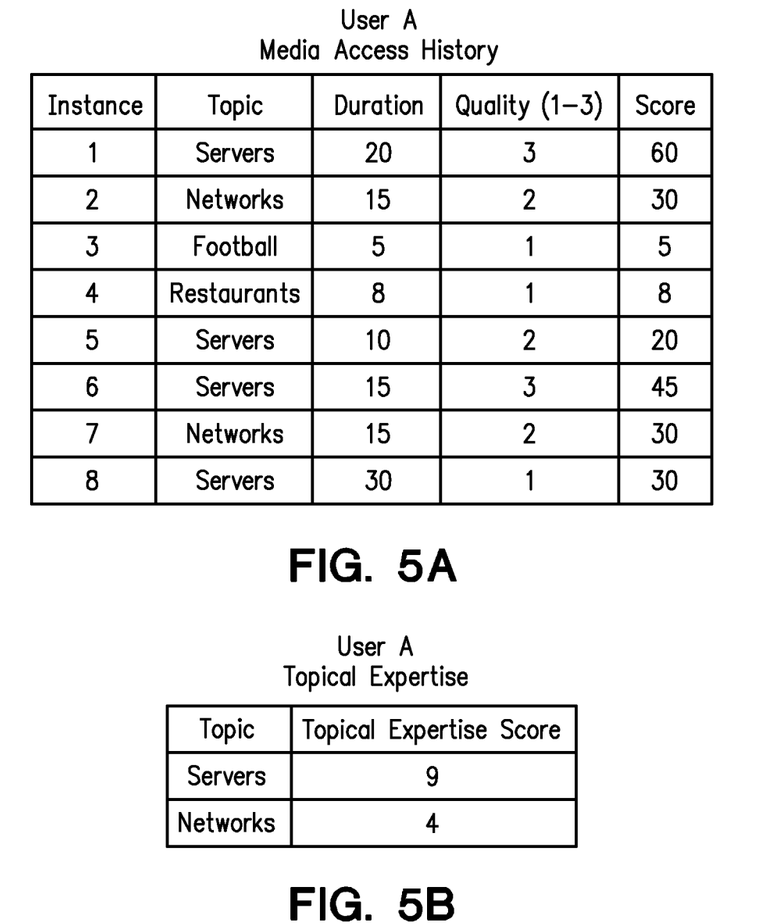
FIG. 5A is a table illustrating an example of media access history for an individual person.
FIG. 5B is a table illustrating an example of an individual person's topical expertise scores on various topics, wherein the topical expertise score is based only on the quality of each instance of media access.

FIG. 5A is a table illustrating an example of media access history for an individual person. In this illustration, User A has eight (8) instances of media access which are numbered 1-8 in the first column. A topic, duration and quality have been determined, wherein duration is in minutes and quality is a scale of 1-3 (3 being the highest quality and 1 being the lowest quality). It should be understood that any scoring algorithm may be used. For purpose of certain embodiments, the duration has been multiplied by the quality to obtain an instance score for that particular instance of media access.

FIG. 5B is a table illustrating an example of an individual person's topical expertise scores on various topics, wherein the topical expertise score is based only on the quality of each instance of media access. Using the data from the illustration of FIG. 5A, the method has been used to determine topical expertise scores for User A. Specifically, User A has two topical expertise scores, including a topical expertise score of 9 on the topic of Servers and a topical expertise score of 4 on the topic of Networks. These topical expertise scores are the sum of the quality levels of each instance of media access for the particular topic.

Figure 5C:
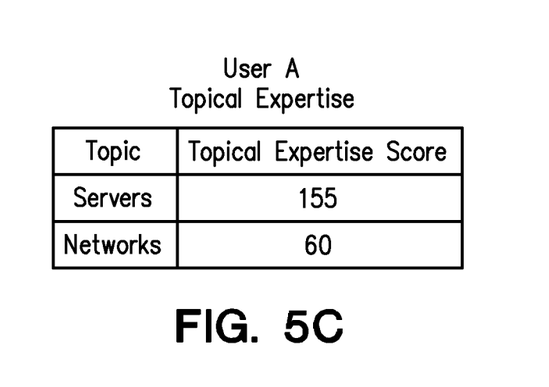
FIG. 5C is a table illustrating an example of an individual person's topical expertise scores on various topics, wherein the topical expertise score is based on the quality and duration of each instance of media access.

FIG. 5C is a table illustrating an example of an individual person's topical expertise scores on various topics, wherein the topical expertise score is based on the quality and duration of each instance of media access. Continuing with the illustration of FIG. 5A, the method has been used to determine topical expertise scores for User A. Specifically, User A has two topical expertise scores, including a topical expertise score of 155 on the topic of Servers and a topical expertise score of 60 on the topic of Networks. These scores result from the sum of the scores in FIG. 5A for instances of the same topic.

Figure 6A:
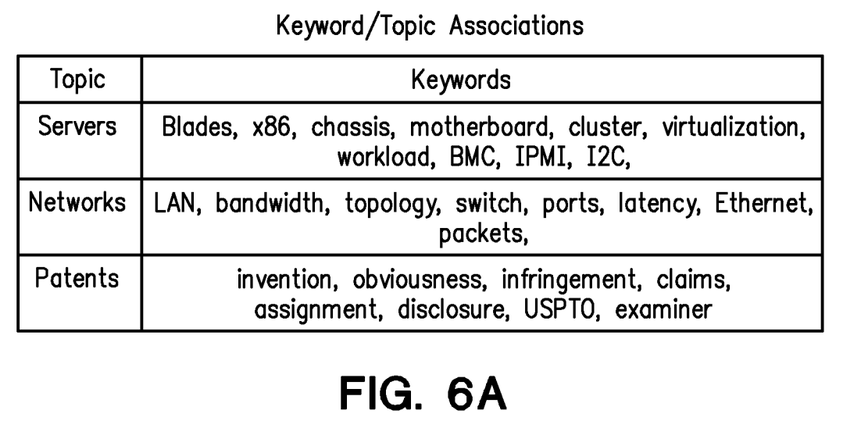
FIG. 6A is a table illustrating an example of associations between keywords and topics.

FIG. 6A is a table illustrating an example of associations between keywords and topics. The topics and keywords on a given row are predetermined as being associated. As media access for the user is monitoring, keywords are identified within the media. The keywords that are found in the table indicate that the media deals with the topic that is associated with the keywords. Identifying multiple keywords associated with a given topic is evidence of a strong indication that the media is directed to a particular topic.

Figure 6B:
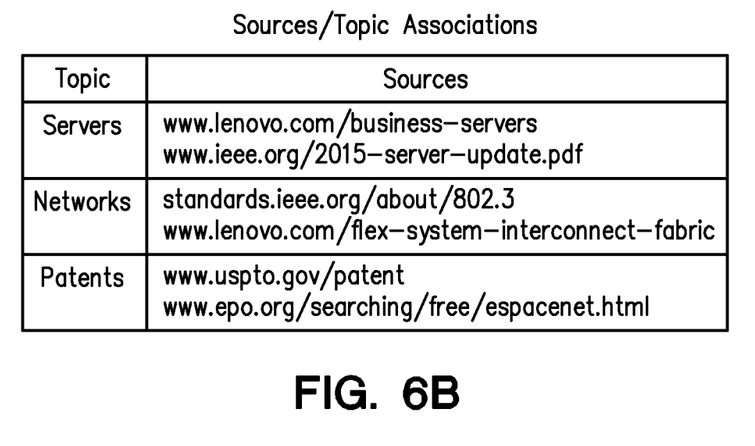
FIG. 6B is a table illustrating an example of associations between media sources and topics.

FIG. 6B is a table illustrating an example of associations between media sources and topics. The topics and sources on a given row are predetermined as being associated. As media access for the user is monitoring, sources of the media are identified. A media source that is found in the table indicates that the media deals with the topic that is associated with the source.

Figure 7:
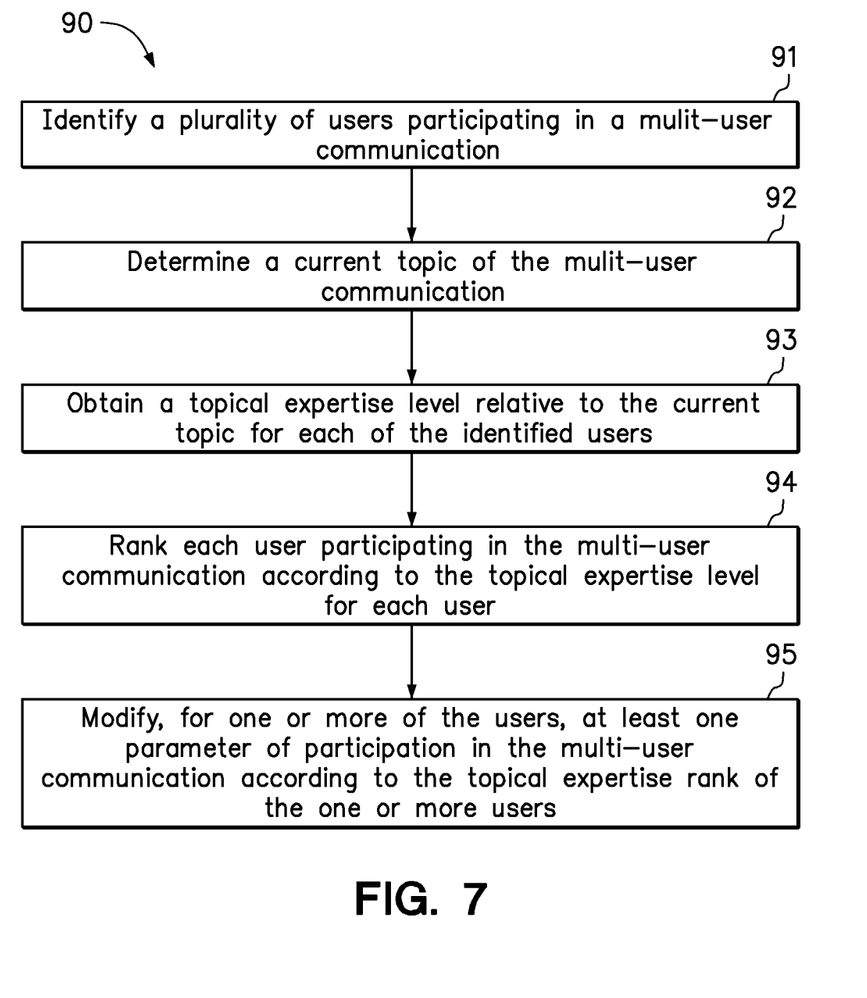
FIG. 7 is a flowchart of a method of managing a multi-user communication based on topical expertise.

FIG. 7 is a flowchart of a method 90 of managing a multi-user communication based on topical expertise. Step 91 identifies a plurality of users participating in a multi-user communication, step 92 determines a current topic of the multi-user communication, and step 93 obtains a topical expertise level relative to the current topic for each of the identified users. In step 94, the method ranks each user participating in the multi-user communication according to the topical expertise level for each user. Then, in step 95, the method modifies, for one or more of the users, at least one parameter of participation in the multi-user communication according to the topical expertise rank of the one or more users.

Figure 8A:
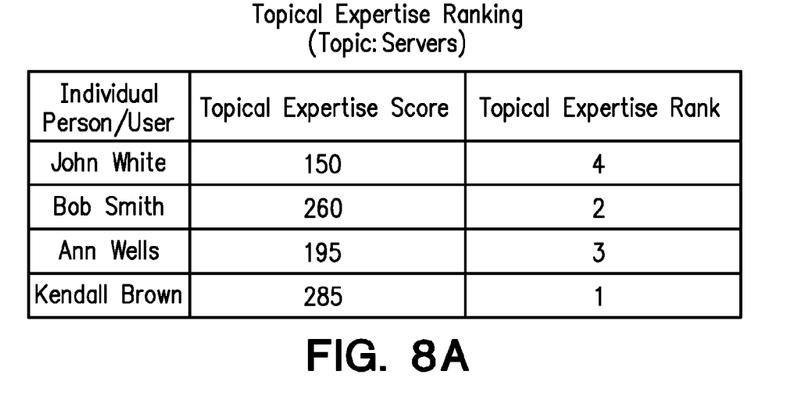
FIG. 8A is a table illustrating an example of a topical expertise ranking among users participating in a multi-user communication.

FIG. 8A is a table illustrating an example of a topical expertise ranking among users participating in a multi-user communication. In this illustration, the method identifies four users participating in a multi-user communication. The topic of the communication is determined to be Servers, such that the method then obtains each of the four users' topical expertise score for the topic of Servers. Since a high topical expertise score is evidence of more expertise (in this illustration), each user is given a topical expertise rank (where a rank of 1 is the highest).

Figure 8B:
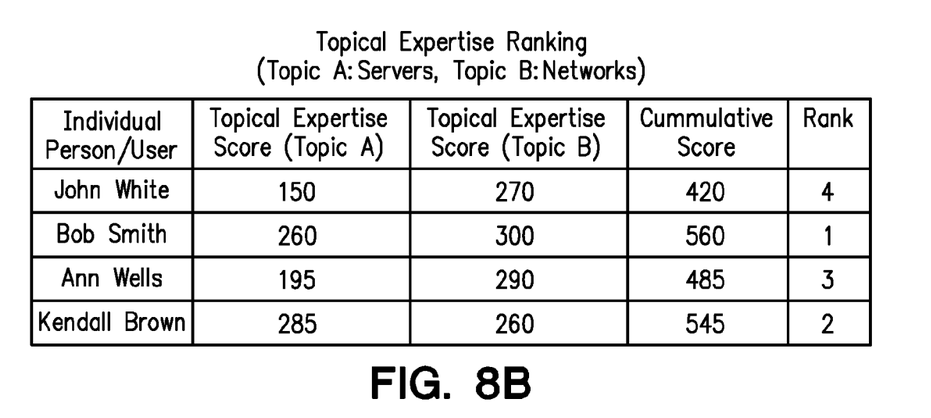
FIG. 8B is a table illustrating an example of a topical expertise ranking among users participating in a multi-user communication when identifying multiple topics.

FIG. 8B is a table illustrating an example of a topical expertise ranking among users participating in a multi-user communication when identifying multiple current topics, whereas the table of FIG. 8A ranked users based on a single topic. Accordingly, the table of FIG. 8B is based on identifying a first topic (Topic A) of Servers and a second topic (Topic B) of Networks. The table then shows, for each of the four users, a topical expertise score for Servers and a topical expertise score for Networks. The two scores are added together (in this illustration) to obtain a cumulative score, which is then ranked (where a rank of 1 is the highest).

Figure 8C:
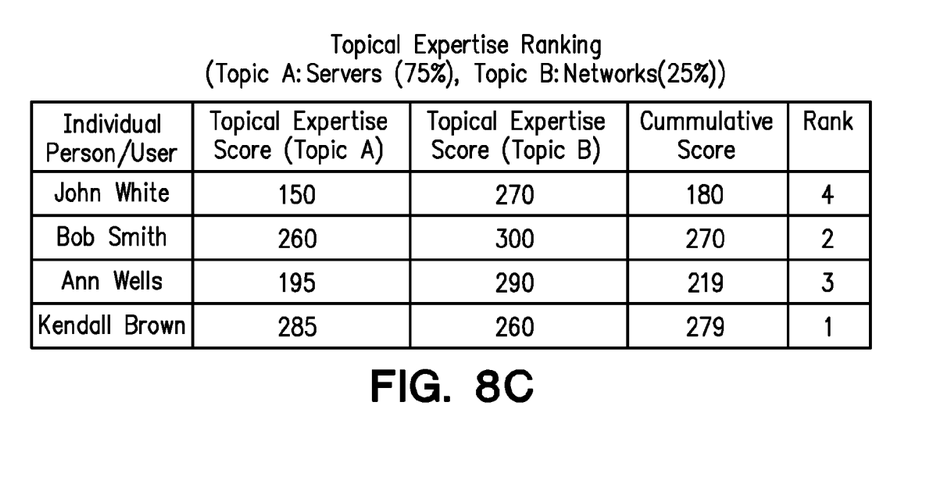
FIG. 8C is a table illustrating an example of a topical expertise ranking among users participating in a multi-user communication when weighting the identified multiple topics.

FIG. 8C is a table illustrating an example of a topical expertise ranking among users participating in a multi-user communication when weighting the identified multiple current topics. Accordingly, the two topical expertise scores for the first topic (Topic A) of Servers and the second topic (Topic B) of Networks are the same as in FIG. 8B. However, the two scores are weighted, with Servers receiving a 75% weight and Networks receiving a 25% weight as an example. A cumulative score is obtained by multiplying topical expertise score for Servers by 0.75 and adding that amount to the product of the topical expertise score for Networks by 0.25. The four users are then ranked according to their cumulative scores. As shown, Kendall Brown has the highest expertise rank when weighting the two scores as in FIG. 8C, whereas Bob Smith has the highest expertise rank when the scores are merely added (equally weighted) as in FIG. 8B.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on a non-transitory computer readable medium that can direct a computer, other programmable data processing apparatus, or other devices to function in a particular manner, such that the instructions stored on the non-transitory computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
   identifying a plurality of users participating in a multi-user communication, wherein each user participates using a communication device that communicates with the communication devices of other users over a network;
   determining a topic of the multi-user communication between the communication devices of the plurality of users;

obtaining a topical expertise level relative to the topic for each of the identified users;

ranking each user participating in the multi-user communication according to the topical expertise level for each user; and assigning the user with the highest topical expertise rank as the moderator, wherein the communication device of the moderator is provided an ability selected from an ability to mute input from the communication device of any of the other users and an ability to delete a post from the communication device of any of the other users.

2. The method of claim 1, wherein the topic is determined periodically during a duration of the multi-user communication.

3. The method of claim 1, wherein determining a topic of a multi-user communication includes identifying the use of keywords within the multi-user communication and determining a topic most closely associated with those keywords.

4. The method of claim 2, further comprising:
repeating the step of ranking the topical expertise level of each user participating in the multi-user communication in response to determining that the topic has changed.

5. The method of claim 1, wherein determining a topic of a multi-user communication includes determining multiple topics of the multi-user communication, and wherein obtaining a topical expertise level relative to the topic for each of the users participating in the multi-user communication includes obtaining a topical expertise level relative to at least one of the topics for each of the users participating in the multi-user communication.

6. The method of claim 5, further comprising:
determining a weighting factor for each of the multiple topics;
wherein ranking each user participating in the multi-user communication according to the topical expertise level for each user, includes ranking each user participating in the multi-user communication according to a composite topical expertise level, wherein the composite topical expertise level for each user is the sum of weighted topical expertise levels for the topics, and wherein the weighted topical expertise level for a topic is the product of the topical expertise level of the user for the topic and the weighting factor for the topic.

7. The method of claim 6, wherein determining a weighting factor for each of the multiple topics, includes:
identifying each occurrence of keywords used in the multi-user communication;
associating each of the identified keywords with one of the topics; and
determining the weighting factor for each topic as the percentage of occurrences of the identified keywords associated with that topic.

8. The method of claim 1, wherein obtaining a topical expertise level relative to the topic for each of the users participating in the multi-user communication, includes manually entering a topical expertise level.

9. The method of claim 1, wherein obtaining a topical expertise level relative to the topic for each of the users participating in the multi-user communication, includes obtaining endorsements from others regarding a topical expertise level of each user relative to the topic.

10. The method of claim 1, wherein obtaining a topical expertise level relative to the topic for each of the users participating in the multi-user communication, includes automatically determining a topical expertise level.

11. The method of claim 1, wherein ranking the topical expertise level of each user participating in the multi-user communication, includes dynamically ranking the topical expertise level of each user participating in the multi-user communication during the communication.

12. A computer-implemented method, comprising:
identifying a plurality of users participating in a multi-user communication, wherein each user participates using a communication device that communicates with the communication devices of other users over a network;
determining a topic of the multi-user communication between the communication devices of the plurality of users;
obtaining a topical expertise level relative to the topic for each of the identified users;
ranking each user participating in the multi-user communication according to the topical expertise level for each user; and
adjusting, for the communication device of one or more of the users, a parameter of participation as a function of topical expertise rank of the user, wherein the parameter of participation is selected from transmission priority and volume.

13. The method of claim 1, further comprising:
displaying a graphical user interface that visually differentiates the topical expertise rank of the one or more users.

14. A computer-implemented method, comprising:
identifying a plurality of users participating in a multi-user communication, wherein each user participates using a communication device that communicates with the communication devices of other users over a network, wherein the multi-user communication is a message board;
determining a topic of the multi-user communication between the communication devices of the plurality of users;
obtaining a topical expertise level relative to the topic for each of the identified users;
ranking each user participating in the multi-user communication according to the topical expertise level for each user; and
tagging a comment with a response value based on the topical expertise level of a user making the comment.

15. The method of claim 1, further comprising:
maintaining a listing of topical experts and a topical expertise level on various topics for each topical expert;
identifying one of the topical experts that has a topical expertise level on the topic that is greater than a predetermined topical expertise level; and
inviting the identified topical expert to join the communication in response to determining that none of the users participating in the multi-user communication has a topical expertise level greater than the predetermined topical expertise level.

16. The method of claim 15, wherein inviting the identified topical expert includes automatically sending a message or initiating a telephone call to the identified topical expert.

17. The method of claim 1, further comprising:
maintaining a listing of topical experts and a topical expertise level on various topics for each topical expert;
identifying one of the topical experts that has a topical expertise level on the topic that is greater than the topical expertise levels of the users participating in the multi-user communication; and inviting the identified topical expert to join the communication in response to determining that the topic of the multi-user communication has not changed for a period of time exceeding a predetermined duration.

* * * * *